3,326,986
PROCESS FOR PURIFYING 4,4′-ISOPROPYL-IDENEDIPHENOL
Gordon F. Dugan, Beaverton, and Alexander H. Widiger, Jr., Midland, Mich., assignors to The Dow Chemical Company, Midland, Mich., a corporation of Delaware
No Drawing. Filed Dec. 2, 1965, Ser. No. 511,237
8 Claims. (Cl. 260—619)

This application is a continuation-in-part of application Serial No. 427,509, filed January 22, 1965 and now abandoned, which was a continuation-in-part of application Serial No. 53,342, filed September 1, 1960, now abandoned.

This invention relates to an improved method for the purification and separation of 4,4′-isopropylidenediphenol from a reaction mixture containing a major proportion of said compound, and also to a method for reducing the color of 4,4′-isopropylidenediphenol.

4,4′-isopropylidenediphenol is conventionally prepared by reacting phenol and acetone, usually in the presence of a mineral acid catalyst, particularly hydrochloric acid, and usually in the presence of a sulfur-containing promoter, such as hydrogen sulfide or an alkyl mercaptan. In some instances the mineral acid is added as aqueous acid, while if hydrochloric acid is to be used, water can be added to the reaction vessel and anhydrous hydrogen chloride passed in to the reactant mixture.

The reaction described above normally results in the production of 4,4′-isopropylidenediphenol as a solid suspended in the reaction slurry. The solid diphenol is then separated from the slurry by various means, is usually washed with water, or otherwise treated as desired, then dried and either packaged for shipment or used captively.

One deficiency which has arisen in the known processes for separating 4,4′-isopropylidenediphenol is the common tendency toward the formation of substantial proportions of mixed crystals of phenol and 4,4′-isopropylidenediphenol in the reaction mixture, together with the difficulty encountered both in removing the mixed crystals from the reaction mixture without removing phenol, and in separating the diphenol from the mixed crystals.

However, it has now been discovered that the above deficiencies have been rectified and very pure 4,4′-isopropylidenediphenol produced by employing in a process for purifying crude 4,4′-isopropylidenediphenol prepared from acetone and phenol and which contains phenol and isomeric diphenols and other phenolic impurities, the improvement of mixing the crude diphenol with from about 0.5 to 2.0 parts of water per part by weight of crude diphenol, heating the resulting mixture to a temperature sufficient to melt any crystals, agitating the resulting fluid mixture, cooling said mixture to a temperature at which a substantial portion of the 4,4′-isopropylidenediphenol crystallizes, separating the resulting crystals and washing the crystals with a suitable solvent. Among the solvents which give very satisfactory results are chloroform, methylene chloride, ethylene dichloride, propylene dichloride and chlorobenzene. The crystals can then be washed with water to remove most of the remaining solvent.

Included in the term "other phenolic impurities" are compounds typically formed in the synthesis of diphenols, such as 2,4′-isopropylidenediphenol, p-(2,2,4-trimethyl-4-chromanyl)-phenol("dianins") and 4,4′(4-hydroxy-m-phenylenediisopropylidene)diphenol("trisphenol").

The "crude diphenol" which is purified by the novel process can be crystals of crude 4,4′-isopropylidenediphenol, or it can be a liquid residue remaining after the water and most of the unreacted phenol have been removed from the reaction mixture by distillation, the residue consisting principally of 4,4′-isopropylidenediphenol. In the latter instance, 0.5–2.0 parts, preferably 1.0 part, by weight of water are used per part of diphenol in the residue. Normally the phenol content of the residue is from about 1 to about 6 percent, based on the water added. After the water is added, the mixture is heated preferably to about 100° C., resulting in an aqueous phase and a liquid organic phase. This mixture of the two phases is cooled slowly, preferably to about 80° to 95° C. to crystallize the 4,4′-isopropylidenediphenol. This crystalline product, after being cooled to below 55° C., is then washed with a suitable solvent, such as one of those previously disclosed, and then can be washed with water, if desired, to displace the major portions of the solvent.

In a typical synthesis of the diphenol, upon completion of the reaction, the reaction mixture consists of a solid phase of crude 4,4′-isopropylidenediphenol and a liquid phase containing small amounts of unreacted phenol and acetone, aqueous hydrochloric acid or other mineral acid, and by-products of the reaction. The ratio of the volume of liquid phase to solid phase will be from about 1:1 to about 3:1. This reaction mixture is cooled to below 55° C., preferably to 40–50° C., to insure substantially complete crystallization of the 4,4′-isopropylidenediphenol and the formation of a slurry of 4,4′-isopropylidenediphenol crystals in the liquid reaction mixture. These crystals are then separated from the reaction mixture, preferably by filtration, and washed with water to remove acid and a portion of the phenol and acetone. This product can be melted and stripped of the remaining phenol to yield a technical grade of 4,4′-isopropylidenediphenol. If a purer product is desired, the washed crystals are added to a quantity of water, i.e., from 0.5 part to 2.0 parts by weight of wet crystals, and this aqueous slurry is heated to a sufficiently high temperature to melt the crystals; i.e., about 100° C., and agitated to ensure adequate contact between the organic and aqueous phases. The resulting liquid mixture is then cooled slowly with agitation to cause substantial crystallization of the 4,4′-isopropylidenediphenol, preferably to 40–50° C., and the crystals separated from the mixture, preferably by filtration. Any isomeric diphenols or other organic impurities remaining on the crystals are conveniently removed by washing with one or more portions of solvent in which the 4,4′-isopropylidenediphenol is substantially insoluble; suitable solvents include chloroform, methylene chloride, ethylene dichloride, propylene dichloride and chlorobenzene. The product may then be treated with water, if desired, to remove residual solvent, and then dried.

In one particular embodiment, an excellent yield of very pure 4,4′-isopropylidenediphenol is prepared by reacting one mole of acetone with from about 1.8 to 2.2 moles of phenol, at from about 50° to 60° C., and under autogenous pressure, this temperature being sufficiently high to insure fluidity of the reaction mixture, and in the presence of 0.5 to 4.5 parts by weight of aqueous hydrochloric acid per part of phenol, said acid containing from 32 to 44 weight percent of hydrogen chloride. The reaction mixture is then cooled to below about 55° C., the thus-formed crystals are separated, as by filtration, and washed with water. Then water is added to the washed crystals, the mixture of crystals and water is heated sufficiently to melt the crystals, the mixture cooled sufficiently to crystallize the 4,4′-isopropylidenediphenol, which is then separated from the mixture.

It has been helpful in some instances, as an aid in preventing the formation of the mixed crystals of phenol and 4,4′-isopropylidenediphenol, to incude with the starting materials an organic solvent which is stable under the reaction conditions, inert to the reactants, and, preferably, can be recovered from the reaction slurry. The solvent is conveniently employed in an amount corresponding to 15 to about 30 percent by weight of the mineral acid and can have appreciable solubility for 4,4'-isopropylidenediphenol at the reaction temperature. Examples of operable solvents are ethylene dichloride and o-dichlorobenzene. Alternatively, the solvent can be added after the reaction is completed and before the reaction slurry is filtered.

When a substantially color-free product is desired, it is sometimes helpful to crystallize 4,4'-isopropylidenediphenol from an aqueous phase that has a pH of from 1 to about 6 during the course of the crystallization. Any of numerous acids can be used for adjusting the pH, such as hydrochloric, sulfuric phosphoric, oxalic, acetic or citric acids, or distilled or deionized water can be used, either alone or after being treated with alkali, which is sometimes necessary in order to obtain the necessary pH range. The crystals can then be washed with one or more portions of a solvent as previously disclosed and dried, if desired.

A satisfactorily color-free product is indicated by obtaining a reading of about 20 or less in an A.P.H.A. alcoholic solution color test.

After 4,4'-isopropylidenediphenol is prepared, as disclosed hereinbefore, the reaction slurry can be filtered, and the filtrate, consisting principally of acid, unreacted phenol, acetone, and reaction by-products, can be recycled with additional amounts of phenol, acetone, and mercaptan to prepare additional quantities of 4,4'-isopropylidenediphenol.

The filtrate from the solvent wash of the water-crystalized material can be distilled to recover the isomeric diphenols as a residue. To this residue additional phenol and acetone can be added, preferably 0.5 to 5.5 parts by weight of phenol to 1 part of isomers, and the phenol and reaction by-products caused to react to prepare 4,4'-isopropylidenediphenol under conditions previously disclosed. More simply, these isomeric diphenols are recycled to the reaction process and thus ultimately converted to the desired 4,4'-isomer. At the conclusion of the process, the reaction slurry can be filtered, the 4,4'-isopropylidenediphenol removed, the filtrate treated to remove by-product isomers, and these isomers reacted to prepare additional 4,4'-isopropylidenediphenol.

*Example I*

A 2500-ml. glass reactor equipped with a glass agitator and immersed in a water bath was charged with 1016 grams of 41 percent hydrochloric acid. To this was added a mixture of 621 grams of phenol (6.6 moles), 174 grams of acetone (3.0 moles), and 1.7 grams of n-octyl-mercaptan. Anhydrous HCl was added through a dip pipe until saturation was attained at approximately 30° C. The reactor was closed and the contents agitated for 5 hours. The temperature of the water bath was raised to 55° C. during the first hour of agitation and remained thereat for the remaining 4 hours. The agitation was then stopped, the excess pressure bled from the reactor, and the reaction slurry filtered. The filter cake was then washed at reduced pressure with approximately one liter of water to remove HCl, some of the phenol, and reaction by-products. The washed cake was transferred to a 2-liter flask equipped with a glass agitator and one-half liter of water was added. This mixture was heated to 95+° C. to melt the crude 4,4'-isopropylidenediphenol and any solid impurities; there were two phases formed, an organic phase and an aqueous phase. The mixture was cooled with agitation to effect crystallization of the 4,4'-isopropylidenediphenol and filtered at about 45° C. using reduced pressure. The filter cake was washed with one 500 gram portion and two 250-gram portions of chloroform, then with 500 grams of water. The water was then removed by filtering under vacuum and the filtered material was dried for two hours at 110° C. in an air circulating oven. There were obtained 600 grams of 4,4'-isopropylidenediphenol crystals freezing at 156.8° C. The chloroform from the filtrate was distilled and an additional 57 grams of diphenol were obtained representing 96.1 percent conversion of the acetone. The yield of high quality 4,4'-isopropylidenediphenol was 91.4 percent of the acetone converted.

*Example II*

A 3000-ml. glass flask equipped with a glass agitator and glass condenser and immersed in a water bath at 40° C. was charged with 775 grams of 36.5 percent hydrochloric acid, 790 grams (8.4 moles) of phenol, 232 grams (4.0 moles) of acetone, 137 grams of ortho dichlorobenzene and 8.4 grams of n-octylmercaptan. Anhydrous HCl was added through a dip pipe throughout the course of the reaction with the excess being vented from the top of the condenser. The contents of the reactor were agitated for 6 hours, the temperature of the water bath being raised to 50° C. during the first hour of agitation and maintained thereat for 4 hours. The reactor was then cooled over a period of one hour to 40° C., the slurry was thinned with 200 ml. chloroform, the agitation was stopped, and the reaction product filtered. The filter cake was washed with five 100-ml. portions of chloroform, then washed with one liter of water, and dried. There were obtained 716 grams of 4,4'-isopropylidenediphenol having a freezing point of 157.0° C. The organic layer contained in the filtrate from the reaction slurry and the solvent layer of the wash filtrate were combined and distilled to obtain an additional 128 grams of diphenols as a residue. The total diphenols separated amounted to 844 grams or 92.5 percent conversion of the acetone used. The yield of high quality 4,4'-isopropylidenediphenol was 84.9 percent of the acetone converted.

*Example III*

In each of several experiments a 2-liter glass flask fitted with a glass agitator and glass condenser was charged with 600 grams of commercial grade 4,4'-isopropylidenediphenol having a freezing point of 155.2° C. and an A.P.H.A. alcohol solution color of 59. Then there were added 600 grams of distilled water adjusted to a certain pH by addition of acid, distilled water with or without added alkali, different acids being used in the several experiments. The isopropylidenediphenol and water were mixed and the mixture was heated to approximately 100° C., resulting in the melting of the solid and the formation of separate aqueous and oil phases. The heating at 100° C. was continued for 0.5 hour, with continuous agitation, then the material was cooled slowly with agitation and was seeded at 96° C. The 4,4'-isopropylidenediphenol was filtered at 55° C. and then washed at room temperature with 6 100-gram portions of chlorofrom and dried.

25 grams of the 4,4'-isopropylidenediphenol prepared in each of the above experiments were dissolved separately in 35-ml. portions of methanol and the color determined in a Klett-Summerson colorimeter using a 40 mm. cell and a #42 filter. The results are shown in the accompanying table. The first two experiments show the undesirably high color obtained when using water that has been adjusted to a pH greater than 6.

TABLE

| Material Used to Adjust pH | pH | APHA Color |
|---|---|---|
| NaOH | 9.0 | 44 |
| NaOH | 8.0 | 30 |
| NaOH | 6.0 | 20 |
| Distilled Water | 5.3 | 16 |
| HCl | 4.0 | 15 |
| $H_3PO_4$ | 4.0 | 15 |
| Acetic | 4.0 | 15 |
| Citric | 4.0 | 15 |

*Example IV*

The distillation residue from Example II weighing 128 grams, was combined with 256 grams of o-dichlorobenzene, and 4,4'-isopropylidenediphenol was crystallized from solution. The crystals were filtered at 30° C., washed with chloroform and dried, yielding 57.4 grams of product freezing at 156.2° C. The o-dichlorobenzene and chloroform were removed from the last filtration by vacuum distillation leaving a residue of 70.6 grams of 4,4'-isopropylidenediphenol isomers. This residue was added to a mixture of 58.6 grams of phenol, 56.8 grams of 36.5 percent hydrochloric acid, 14.2 grams o-dichlorobenzene, and 0.6 gram of n-octylmercaptan. This mixture was heated to 50–55° C. and maintained thereat for 19 hours, while treating the reaction mixture with anhydrous HCl. The HCl, water, mercaptan, and phenol were removed by vacuum distillation and the residue crystallized from an o-dichlorobenzene solution. After the crystals were washed and dried there were recovered 50.0 grams of 4,4'-isopropylidenediphenol. This combined with the previous quantity of 57.4 grams gave a total yield of 107.4 grams, representing an 84 percent recovery of 4,4'-isopropylidenediphenol based on the total residue. The 4,4'-isopropylidenediphenol thus recovered had a freezing point of 156.4° C.

We claim:

1. In a process for purifying crude 4,4'-isopropylidenediphenol prepared from acetone and phenol and which contains phenol and isomeric diphenols and other phenolic impurities, the improvement of mixing the crude diphenol with water, heating the resulting mixture to a temperature sufficient to melt any crystals, agitating the resulting fluid mixture, cooling said mixture to a temperature at which a substantial portion of the 4,4'-isopropylidenediphenol crystallizes, and separating the resulting crystals.

2. The process of claim 1 wherein the water phase in contact with the crude diphenol has a pH of 1 to 6.

3. The process of claim 1 wherein the 4,4'-isopropylidenediphenol crystals are washed with a solvent selected from the group consisting of chloroform, methylene chloride, ethylene dichloride, propylene dichloride and chlorobenzene.

4. A process as in claim 3 wherein the solvent is chloroform.

5. In a process for purifying crude 4,4'-isopropylidenediphenol prepared from acetone and phenol, which contains phenol and isomeric diphenols and other phenolic impurities, the improvement of separating the crystalline material from the reaction mixture below about 55° C., washing the crystals with water, adding water to the washed crystals, heating the mixture of crystals and water sufficiently to melt the crystals, cooling this mixture sufficiently to cause crystallization of the 4,4'-isopropylidenediphenol, and separating the 4,4'-isopropylidenediphenol from the said mixture.

6. A process as claimed in claim 5 wherein the crystalline 4,4'-isopropylidenediphenol is separated from the reaction mixture at from about 40–50° C., and the water is added to the washed crystals in the amount of from about 0.5 to 2 parts of water for each part by weight of wet crystals.

7. The process of claim 5 wherein the crystallization from water is carried out by maintaining the water phase at a pH of 1 to 6.

8. A process for making 4,4'-isopropylidenediphenol and separating same from its reaction mixture, comprising, contacting 1 mole of acetone with from about 1.8 to 2.2 moles of phenol, at a temperature of from about 50° C. to 60° C., said temperature being sufficiently high to insure fluidity of the reaction mixture, and in the presence of from 0.5 to 4.5 parts by weight of aqueous hydrochloric acid per part of phenol, said hydrochloric acid containing from 32 to 44 percent by weight of hydrogen chloride, cooling the reaction mixture to below about 55° C., separating the thus formed crystals, washing the crystals with water, adding water to the washed crystals, heating the mixture of crystals and water sufficiently to melt the crystals, cooling this mixture sufficiently to cause crystallization of the 4,4'-isopropylidenediphenol, and separating the 4,4'-isopropylidenediphenol from the mixture.

References Cited

UNITED STATES PATENTS 2,858,343   10/1958   Hoaglin et al. _____ 260—619
2,936,272   4/1960    Bender et al. _____ 260—616 X LEON ZITVER, *Primary Examiner.*

D. M. HELFER, HELEN ROBERTS,
*Assistant Examiners.*